(12) United States Patent
Jacobs et al.

(10) Patent No.: US 6,942,282 B1
(45) Date of Patent: Sep. 13, 2005

(54) WRAP-AROUND CAB CONTROL LAYOUT FOR BALE WAGON

(75) Inventors: Stephen W. Jacobs, Lititz, PA (US); Frederic B. Thomson, Jr., Robesonia, PA (US)

(73) Assignee: CNH America LLC, New Holland, PA (US)

( * ) Notice: Subject to any disclaimer, the term of this patent is extended or adjusted under 35 U.S.C. 154(b) by 9 days.

(21) Appl. No.: 10/870,383

(22) Filed: Jun. 17, 2004

(51) Int. Cl.[7] .............................................. B62D 33/06
(52) U.S. Cl. .............................. 296/190.08; 296/190.01
(58) Field of Search ...................... 296/190.01, 190.08, 296/190.1, 190.11

(56) References Cited

U.S. PATENT DOCUMENTS

| | | | |
|---|---|---|---|
| 4,124,246 A | 11/1978 | Brown et al. ................... 296/28 |
| 4,227,845 A | 10/1980 | Colby et al. .................... 414/39 |
| 4,416,486 A | 11/1983 | McNaught et al. ........... 296/190 |
| 4,471,848 A | 9/1984 | Skytoen ......................... 180/90 |
| 4,505,510 A | 3/1985 | Lepoix .......................... 296/70 |
| 4,619,386 A | 10/1986 | Richardson .................. 224/277 |
| 5,673,963 A | 10/1997 | Pietzsch ...................... 296/190 |
| 5,890,756 A | 4/1999 | Pranger et al. ............ 296/37.12 |
| 5,906,411 A | 5/1999 | Stauffer et al. .......... 296/190.11 |
| 6,244,369 B1 * | 6/2001 | Yunoue et al. .......... 296/190.11 |
| 6,276,749 B1 * | 8/2001 | Okazawa et al. ....... 296/190.01 |
| 6,286,897 B1 * | 9/2001 | Ruhter et al. ........... 296/190.01 |
| 6,446,738 B1 | 9/2002 | Boyd .......................... 175/219 |
| 6,612,636 B2 * | 9/2003 | Arthur et al. ........... 296/190.01 |
| 6,692,051 B1 * | 2/2004 | Cook et al. .............. 296/190.01 |
| 6,715,269 B2 * | 4/2004 | Nanlawala et al. ..... 296/190.01 |
| 2003/0042760 A1 * | 3/2003 | Arthur et al. ........... 296/190.01 |
| 2003/0184123 A1 * | 10/2003 | Amamiya et al. ....... 296/190.01 |
| 2003/0230447 A1 * | 12/2003 | Wulfert et al. .......... 296/190.01 |
| 2004/0217629 A1 * | 11/2004 | Shioji et al. ............ 296/190.11 |

* cited by examiner

*Primary Examiner*—Jason Morrow
(74) *Attorney, Agent, or Firm*—John William Stader

(57) ABSTRACT

An optimized bale wagon cab that, while maintaining the previously used cab footprint, employs a layout with a wrap around front dash. The layout provides more efficient use of the space available and better placement of everyday controls such as the transmission shifter and bale stacking controls. The layout further addresses the customer desires for additional storage, cup holders, a writing surface and a place to keep papers and clipboards.

11 Claims, 2 Drawing Sheets

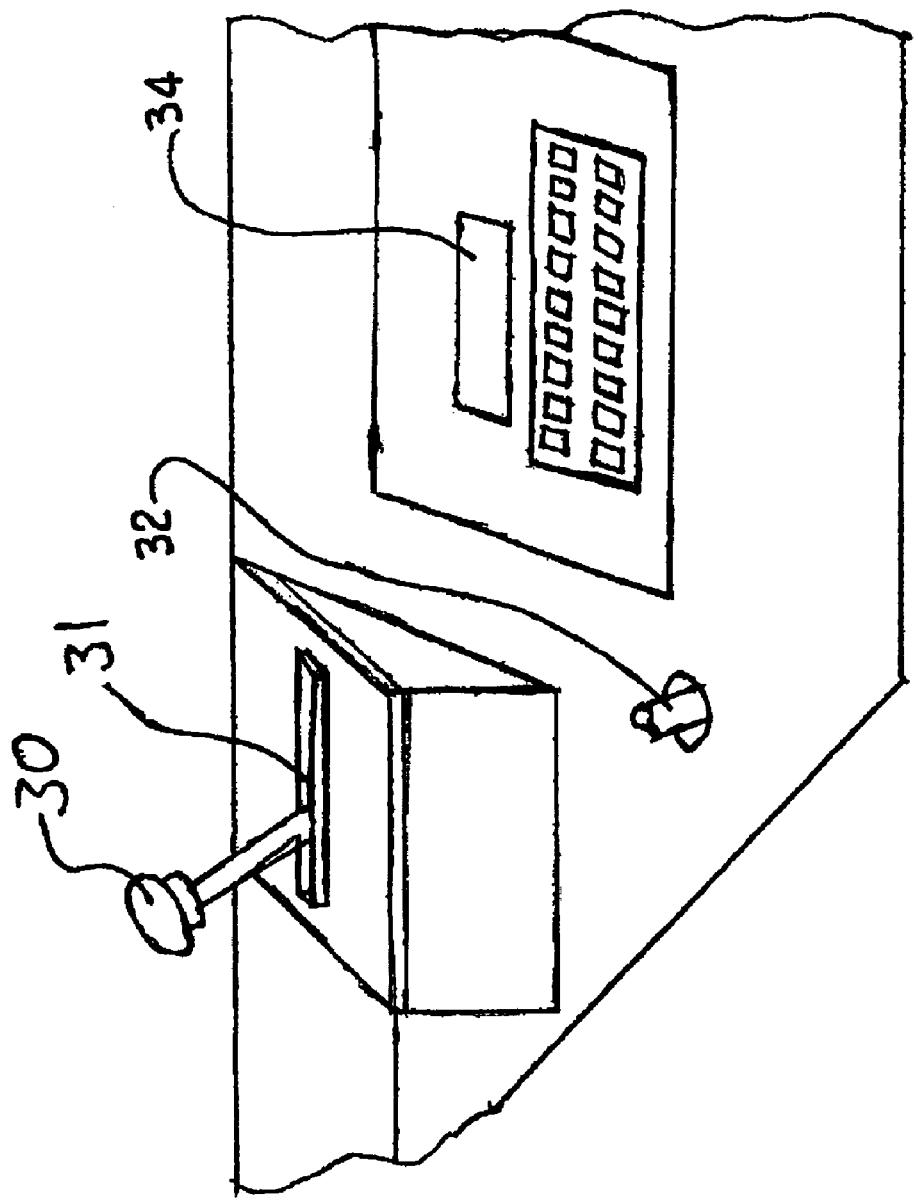

US 6,942,282 B1

WRAP-AROUND CAB CONTROL LAYOUT FOR BALE WAGON

BACKGROUND OF THE INVENTION

The present invention relates generally to self-propelled agricultural bale wagons and, more particularly to an improved layout for the cab of such a bale wagon.

One of the most significant advances made in agricultural mechanization over the past few decades was the development of the automatic bale wagon by G. E. Grey. Grey's bale wagon, described in U.S. Pat. No. 2,848,127, is principally adapted for stacking bales and is basically comprised of three tandomly arranged cooperating tables. In operation, the basic Grey wagon functions to pick up bales, form them into a composite stack, and subsequently discharge the entire stack in a storage area. Since the inception of the basic Grey wagon, many advancements have been achieved to improve the functionality, operability and ease of use of the implement.

The bale wagon can be either pulled through the field by a tractor, or self-propelled. Particularly in the warmer climates, the self-propelled units are most popular and manufactured with a cab that is air-conditioned for increased operator comfort. It is a fairly unique characteristic that the cabs used on bale wagons are smaller and more Spartan in comparison to those on other agricultural implements such as tractors or combine harvesters. Generally, the footprint of a bale wagon is approximately one-third that of a combine harvester. This is true because, even though they receive considerable use in adverse conditions, bale wagons do not generate the income of other equipment needed to justify a spacious comfort center for the operator. Additionally, the cab footprint on the Grey-type bale wagon must be kept to a minimum in order to clear all functioning areas of the bale wagon. These limitations do not, however, eliminate the need to satisfy operator requests for improved comfort and additional features.

Thus, the need exists for a bale wagon cab that maximizes the operator's view of farming operations, yet is as spacious as possible, has a well-designed environment system and allows for easy access to the implement systems.

SUMMARY OF THE INVENTION

Accordingly, it is an object of the present invention is to provide an optimized bale wagon cab.

Another object of the present invention is to provide an optimized bale wagon cab which has a wrap around control console design.

It is another object of the instant invention to provide an optimized bale wagon cab that allows more efficient use of the space available and better placement of everyday controls.

It is a further object of the instant invention to provide an optimized bale wagon cab that includes customer desired additions, such as storage for a water jug, storage for a cooler, a larger tool box, cup holders, a flat writing surface and a location to keep papers and clipboards.

It is yet another object of the instant invention to provide an optimized bale wagon cab that provides the operator with more creature comfort space within the previously available cab footprint.

It is yet another object of the instant invention to provide an optimized bale wagon cab that is durable in construction, inexpensive of manufacture, carefree of maintenance, facile in assemblage, and simple, versatile and effective in use.

These and other objects are attained by providing an optimized bale wagon cab that, while maintaining the previously used cab footprint, employs a layout with a wrap around front dash. The layout provides more efficient use of the space available and better placement of everyday controls such as the transmission shifter and bale stacking controls. The layout further addresses the customer desires for additional storage, cup holders, a writing surface and a place to keep papers and clipboards.

DESCRIPTION OF THE DRAWINGS

The advantages of this invention will be apparent upon consideration of the following detailed disclosure of the invention, especially when taken in conjunction with the accompanying drawing3 wherein:

FIG. 2 is a side elevational view of the shifter and multi-function control handle, taken along line 2—2 of FIG. 1.

DESCRIPTION OF THE PREFERRED EMBODIMENT

Figure 1:
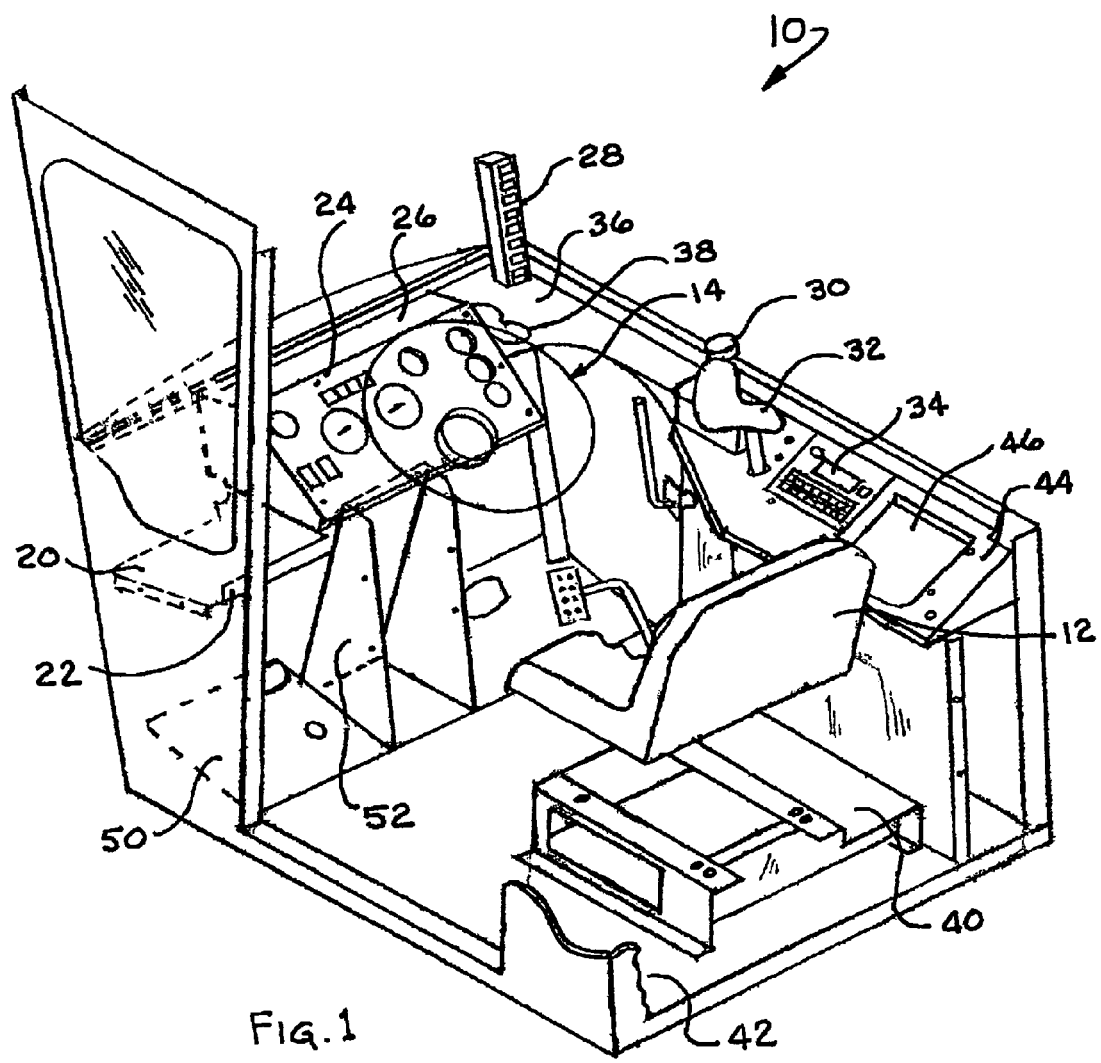
FIG. 1 is a partial upper left rear perspective view of the cab of the instant invention, with several components shown in phantom.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Self-propelled bale wagons, with operator cabs, have been have been in use for quite a few years, as shown, for example, in U.S. Pat. No. 4,227,845. Attention is directed to FIG. 1 of the '845 patent as a general depiction of a bale wagon. The description of the BACKGROUND section of that patent also provides a reasonably thorough general explanation of the operation of the operation and functionality of the unit.

Referring now to the drawing, it is possible to observe the major elements and general operation of the present invention. A typical bale wagon cab 10 provides a platform from which the operator manages the pick up and stacking of bales. Cab 10 has an operator's seat 12 located behind the steering wheel 14.

The instant invention is to an optimized cab layout generally seen as a wrap-around front dash into the right hand side console. Starting at the left hand of the front dash there is an angled shelf 20 for the storage of a water jug or the like, the downward and forward angle to keep the contents in place during travel through rough fields. An upward lip 22 on the rear edge of the shelf may be included to further assist in keeping the contents in place. A relatively small compact angled dash 24, with all needed gauges and an ignition switch, is positioned in front of the operator to allow for improved line-of-sight observation and operation of the bale wagon primary power and motive functions. The top 26 of the dash 24 is angled forwardly and downwardly to provide a location for clipboards and the like, and to prevent them from sliding around in an unorganized manner. A bank of indicator lights 28 are located in the right hand front corner to alert the operator of any trouble with the various operational components of the bale wagon. The shifter 30 is relatively close to the operator and is located in the front corner of the right hand console. A multi-function control handle 32 controls bale stack functions and a larger display panel 34 continuously shows the function status. An additional sloped surface panel 44 fills out the remainder of the right hand area extending to the rear wall of the cab. A removable or pivotable cover plate 46 in panel 44 may be used to protect various components such as, for example, fuses. A flat surface plate 36 connects the front dash 24 with the right hand console and incorporates cup holders 38. The flat surface provides a writing platform, if needed.

A tool tray can be slid between the seat support 40 and the right hand console for storage, and under the seat support 40. The space 42 between the seat and the left hand rear cab wall allows a cooler to be stored out of the way.

The front floor area 50 is angled forwardly and upwardly for more comfortable position of the operator's feet and a small steering column housing 52 for more knee room.

Thus, there has been described a bale wagon cab with a generally rectangular footprint approximately 42"×46". The portion of the cab below the operator's seat, except for the door, is generally solid sheet metal with framed glass above. The front windshield is usually slightly curved side to side, but may be planar. Corner posts generally provide support for the roof, in which the air conditioning unit is usually located. The wrap-around control console design, when considered in association with a seat 12 that swivels into two positions in both directions, the first approximately 15 degrees and the second 30 degrees (reducing operator neck fatigue), allows a more comfortable arrangement for the operator, such that the controls are easily and readily accessible from in either the straight forward (for road transport) or the pivoted positions (for field operations). The right hand console is mostly open below the console components to provide additional leg/knee room for the operator when the seat is pivoted to the right. This layout optimizes use of the available space and provides better placement of everyday controls such as the transmission shifter and bale stacking controls.

FIG. 2 is a side elevation view of the shifter 30 and multi-function control handle 32. As can be seen both units are incorporated into the layout in a manner making each readily accessible by the operator. The shifter controls an automatic transmission, so it operates basically within an elongate slot 31 to move between positions.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:
1. A bale wagon cab, comprising:
a generally rectangular horizontal support platform with a generally upwardly extending left front, left rear, right front and right rear posts on respective corners thereof, a generally rectangular roof approximately the same size as said platform supported above said platform on said posts;
a front panel, an opposing rear panel, and a right panel, each said panel enclosing a portion of the area between said platform and said roof and adjacent posts, and having at least an upper portion of a transparent material;
a left section, including a pivoting door, said left section opposing said right panel and enclosing a portion of the area between said platform and said roof between the left front and left rear posts;
a steering column and an operator's seat positioned within the enclosure formed by said panels and said section;
a first storage bin located in the corner formed by said front panel and said left section, said first storage bin being generally open and having a rearwardly inclined bottom side;
an inclined dash affixed to said front panel and said first storage bin and extending toward, but not to, said right front post, said dash containing the ignition and various indicators and controls for the motive power of the bale wagon;
an inclined display panel affixed to said right hand panel, said display panel showing the functional status of the bale wagon;
a generally flat horizontal plate fixed in the corner formed by said front and right hand panels and extending between said dash and said display panel;
a transmission shifter projecting from an extension to said flat plate and extending upwardly adjacent said right hand panel;
a multi-functional control handle extending through said inclined display panel; and
each of said first bin, said dash, said horizontal plate and said display panel positioned such that the space underneath each of said first bin, said dash, said horizontal plate and said display panel is optimized to provide additional space for operator comfort.
2. The cab of claim 1, further including:
a bank of indicator lights affixed to said right front post adjacent and above said horizontal plate, said indicator lights showing any negative conditions of the bale wagon.
3. The cab of claim 2, wherein:
said operator's seat swivels approximately 15 degrees to the left and 30 degrees to the right; and
said horizontal plate incorporates at least one cup holder.
4. The cab of claim 3, wherein:
said seat is supported on said platform by a seat support; and
a second storage area is created in the area between said seat platform, said left section, and said rear panel.
5. The cab of claim 4, wherein:
said seat support has a space hereunder forming a third storage area.
6. In a bale wagon cab having a generally rectangular horizontal support platform with a generally upwardly extending left front, left rear, right front and right front rear posts on respective corners thereof, a generally rectangular roof approximately the same size as said platform supported above said platform on said posts:

a front panel, an opposing rear panel, and a right panel, each said panel enclosing a portion of the area between said platform and said roof and adjacent posts, and having at least an upper portion of a transparent material;

a left section, including a pivoting door, said left section opposing said right panel and enclosing a portion of the area between said platform and said roof between the left front and left rear posts;

a steering column and an operator's seat positioned within the enclosure formed by said panels and said section, the improvement comprising;

a first storage bin located in the corner formed by said front panel and said left section, said first storage bin being generally open and having a rearwardly inclined bottom side;

an inclined dash affixed to said front panel and said first storage bin and extending toward, but not to, said right front post, said dash containing the ignition and various indicators and controls for the motive power of the bale wagon;

a transmission shifter extending upwardly adjacent said right hand panel;

an inclined display panel affixed to said right hand panel, said display panel showing the functional status of the bale wagon;

a multi-functional control handle extending through and generally upwardly from said inclined display panel;

a generally flat horizontal plate fixed in the corner formed by said front and right hand panels and extending between said dash and said display panel; and each of said first bin, said dash, said horizontal plate and said display panel positioned such that the space underneath each of said first bin, said dash, said horizontal plate and said display panel is optimized to provide additional space for operator comfort.

7. The improvement of claim 6, further including:

a bank of indicator lights affixed to said right front post adjacent and above said horizontal plate, said indicator lights showing any negative conditions of the bale wagon.

8. The improvement of claim 6, wherein:

said operators seat swivels approximately 15 degrees to the left and 30 degrees to the right; and said horizontal plate incorporates at least one cup holder.

9. The improvement of claim 8, wherein:

said seat is supported on said platform by a seat support; and a second storage area is created in the area between said seat platform, said left section and said rear panel.

10. The improvement of claim 9, wherein:

said seat support has a space hereunder forming a third storage area.

11. The improvement of claim 7 further including:

said operator's seat swivels approximately 15 degrees to the left and 30 degrees to the right; and said horizontal plate incorporates at least one cup holder.

* * * * *